June 21, 1960  A. R. GEDANCE  2,942,118
RADIANT ENERGY ANGULAR TRACKING APPARATUS
Filed Feb. 12, 1958  2 Sheets-Sheet 1
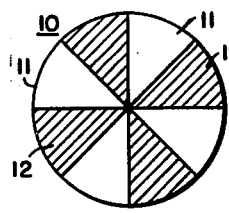
Fig. IA
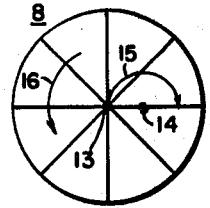
Fig. IB
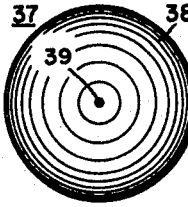
Fig. IC
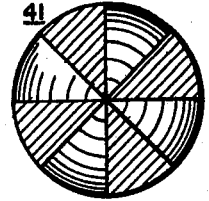
Fig. ID
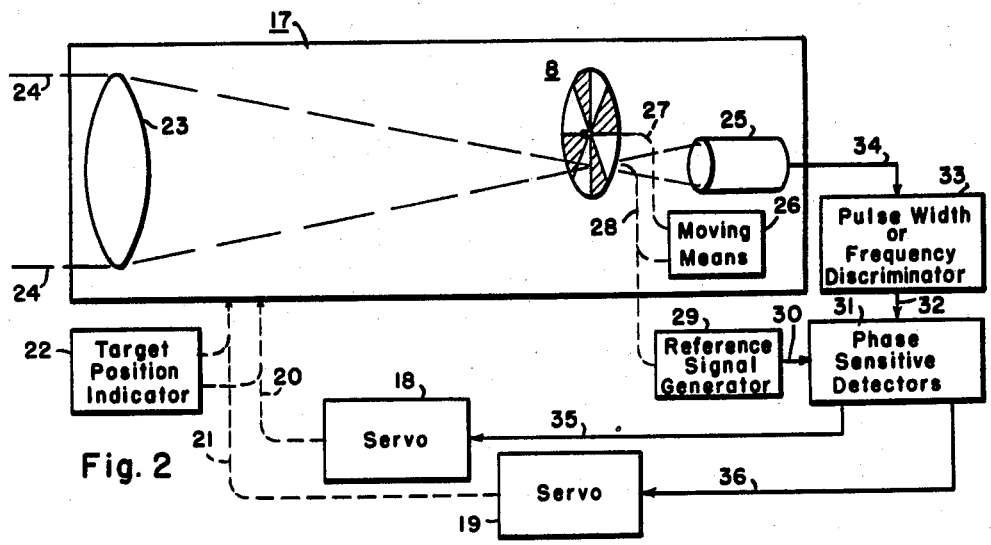
Fig. 2
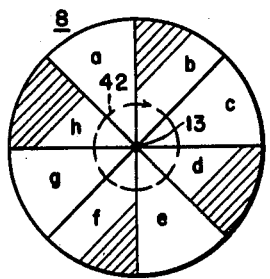
Fig. 3A
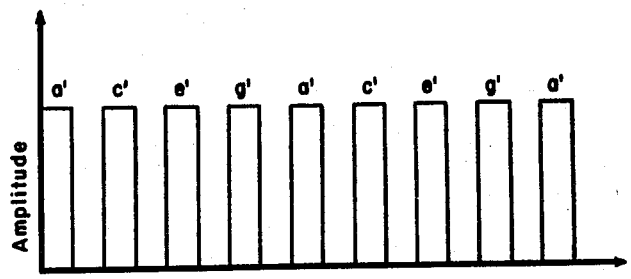
Fig. 3B
WITNESSES
John E. Healy, Jr.
Wm. B. Sellers.
INVENTOR
Alan R. Gedance
BY Maury I. Hull
ATTORNEY United States Patent Office 2,942,118
Patented June 21, 1960

2,942,118

RADIANT ENERGY ANGULAR TRACKING APPARATUS

Alan R. Gedance, Severna Park, Md., assignor to Westinghouse Electric Corporation, East Pittsburgh, Pa., a corporation of Pennsylvania Filed Feb. 12, 1958, Ser. No. 714,925

9 Claims. (Cl. 250—203)

This invention relates to improvements in radiant energy angular tracking apparatus, and more particularly to angular tracking apparatus responsive to radiant energy in the visible and adjoining infrared and ultraviolet portions of the radiant energy spectrum.

Prior art automatic tracking apparatus for tracking sources of radiant energy in the above-identified portions of the radiant energy spectrum are of a number of different kinds, but common to the various prior art devices is an optical system of lenses and/or reflectors which intercept the radiant energy from the target source and focus it into an image which may be visible or invisible, and prior art devices also provide apparatus for scanning the image plane to ascertain the position of the target source with respect to the optical axis of the tracking apparatus.

One prior art device employs a reticle which is divided into alternate transparent and opaque sectors, or some other similar pattern. This reticle is placed in the image plane and is rotated about its own axis. If a target image falls anywhere other than the center of the reticle, a time varying quantity of energy passes through the reticle. This radiant energy is directed at a photosensitive detector element, and thus generates an electrical error signal showing that the target lies off the center of the pattern or away from the optical axis. The angular position of the target image with respect to the center of the reticle is ascertained by comparing the time phase of the output signal of the photodetector with a reference phase provided by a reference signal.

Other prior art apparatus employing scanning makes use of a stationary reticle placed in the image plane, combined with a nutating motion of the entire optical system. The nutation of the optical system results in a "conical" scan similar to that commonly used in tracking radar apparatus. As a result of the conical scan all points on the image plane describe small circles with respect to a reference point. If a reticle with alternate transparent and opaque sectors is used, then the relative motion of the reticle and a target image gives rise to a pluse modulation of the detected energy. If, and only if, the circle described by the image is concentric with the reticle pattern, a constant pulse width signal will result. If the circle is not concentric, then the pulse train is frequency modulated at a rate equal to the nutation rate of the optical system, and with a deviation which increases as the image circle moves farther from concentricity with the reticle.

Both of the aforedescribed prior art devices have certain inherent disadvantages however. In the case of the prior art apparatus employing a rotating reticle, tracking accuracy is quite limited by the resolution of the optical system. In the instant invention, these limitations are much less severe. With respect to the last-named prior art apparatus, the necessity for nutating the entire optical system and photosensitive cell calls for the solution of mechanical difficulties and nutating or moving apparatus of considerable size and power.

The apparatus of the instant invention overcomes these and other disadvantages of the prior art and achieves the effect of conical scan without moving any part of the lens or reflector system, and without movement of the radiant energy detector element. This is accomplished by displacing the axis of the reticle laterally from, and rotating the axis of the reticle about, the optical axis of the apparatus, thereby providing an arrangement in which nutation of the optical system is simulated. In addition to this rotation of the axis of the reticle about the optical axis, the reticle may also be rotated about its own axis if desired.

Accordingly, a primary object of the invention is to provide new and improved radiant energy responsive apparatus.

Another object is to provide new and improved radiant energy angular tracking apparatus having means for simulating nutation of an optical system.

Other objects and advantages will become apparent after a study of the following specification when read in connection with the accompanying drawings, in which:

Figures 1A, 1B, 1C and 1D are views of reticles of the prior art and also of the instant invention;

Fig. 2 is an electrical circuit diagram of apparatus according to the preferred embodiment of the invention;

Figs. 3A and 3B are graphs illustrating the operation of the apparatus of Fig. 2 while the direction to the target source coincides with the optical axis.

Figure 4A:
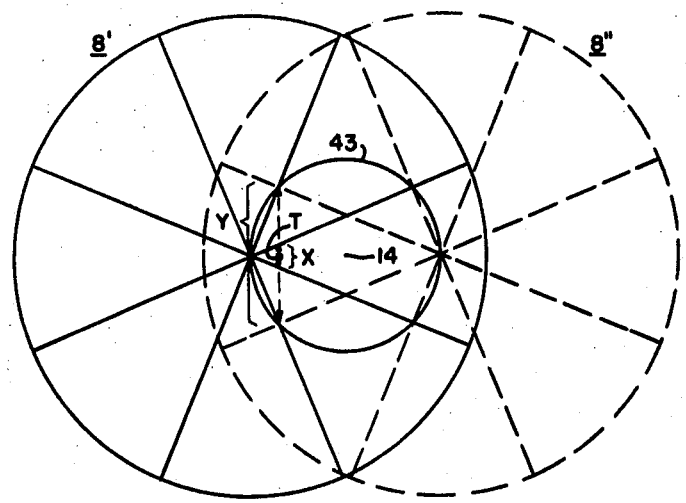
Figs. 4A and 4B are figures drawn to a different scale illustrating the operation of the apparatus of Fig. 2 while the direction to the target source lies at an angle with respect to the optical axis.

Referring now to the drawings in which like reference numerals are used throughout to designate like parts for a more detailed understanding of the invention, and in particular to Fig. 1A thereof, there is shown a reticle generally designated 10 having a plurality of transparent sectors 11 and a plurality of opaque sectors 12, the transparent and opaque sectors alternating with each other. Such a reticle is employed in prior art tracking apparatus hereinbefore described and is also employed in apparatus embodying the subject invention, any suitable number of alternate opaque and transparent sectors being provided.

In Fig. 1B there is generally illustrated the motion of the reticle 8 provided in the apparatus of the instant invention, it being understood that for clarity of illustration of the movement of the reticle, the alternate opaque and transparent sectors are not shown. The axis 13 of the reticle 8 is rotated about a point 14 representing or lying on the optical axis, and the direction of motion of the reticle axis 13 is illustrated by the arrow 15, it being understood that the direction of motion indicated by the arrow 15 could be in the opposite angular direction if desired. As hereinbefore stated, the reticle 8 may also rotate about its own axis 13, this rotation being indicated by the arrow 16 of Fig. 1B.

Particular reference should be made now to Fig. 2 in which there is shown, largely in block form, an electrical circuit diagram of the apparatus according to the preferred embodiment thereof. The reference numeral 17 generally designates a mounting for the optical system, reticle, and detector of the tracking apparatus, and which may be of any desired shape such as cylindrical as shown, the mounting 17 being movable in two planes or directions substantially perpendicular to each other by servo moving apparatus shown in block form and generally designated 18 and 19, these being coupled to casing or mounting 17 by the link or mechanical coupling means 20 and 21 respectively. The servo moving devices 18 and 19 are provided for purposes which will become hereinafter more clearly apparent, and operatively connected to them is a target position indicator shown in block form and generally designated 22, the target position indicator being of any convenient design such, for example, as a cathode ray tube device and associated apparatus.

Mounted within the casing on mounting means 17 by any convenient means, not shown, is a lens 23 constructed and arranged to focus radiant energy arriving by way of path 24 at a focal point or at an image plane which is preferably substantially coplanar with the plane of the reticle 8, and thence the radiant energy passing through the reticle impinges on a radiant energy sensitive detector device, such as a photocell, designated 25. Whereas for convenience of illustration a single lens 23 has been shown, it should be understood that an optical system employing as many lenses and/or reflectors as desired, could be employed, the particular optical system forming no part of this invention.

As aforementioned, the reticle 8 is constructed and arranged to have movement in one or both of two different manners or patterns of movement, one of these being rotation of the axis of the reticle about the optical axis while the reticle does not rotate about its own axis, and the other rotation of the reticle about its own axis while at the same time having its axis rotated about the optical axis. Suitable rotating means of any convenient design is shown in block form and designated 26, moving means 26 being mechanically coupled to the reticle 8 by coupling 27 for providing rotation of the reticle about its own axis, and moving means 26 being coupled to the reticle 8 by coupling 28 for providing for rotation of the axis of the reticle about the optical axis of the lens system. It should be understood that coupling means 27 may be omitted, if desired, or suitable means, not shown, be provided for rendering this coupling inoperative so that the only motion of reticle 8 is rotation of its axis about the optical axis. The output of the moving means 26 is also mechanically coupled as by means including the coupling 28 to a reference signal generator of any convenient design, shown in block form and designated 29. Generator 29 may provide a reference signal in synchronism with the rotation rate of the center or axis of the reticle about the optical axis. The electrical reference signal output of the reference signal generator 29 is applied by lead means 30 to a phase sensitive detector of any convenient design shown in block form and generally designated 31. The phase sensitive detector 31 is provided for purposes which will become hereinafter more clearly apparent, and has applied thereto by lead means 32 the output of a pulse width or pulse frequency discriminator of any convenient design shown in block form and generally designated 33, the pulse width or pulse frequency discriminator 33 receiving the output of photocell or other radiation sensitive device 25 by way of lead means 34. While the target source is off track, an error signal, which may under some conditions be substantially sinusoidal, is provided, and the magnitude of the error signal is proportional to the error in tracking.

As will be readily understood by those skilled in the art, the phase difference between the error signal and reference signal is dependent upon the direction of the tracking error, and this information is resolved by the phase sensitive detector 31 into right-left and up-down error signals. The output of the phase sensitive detector 31 accordingly comprises a pair of signals, which may be direct current, the instant values of which are equal to the instant components of error in the two planes, and which are applied by lead means 35 and 36 to the aforementioned servo moving means 18 and 19, respectively, and are utilized by the servo devices to position the mounting 17, the signal on lead means 35, for example, being the up-down signal and the signal on lead means 36 being the left-right signal, representing the error in the positioning of the casing 17, that is, the location of the target off-center of the aforementioned optical axis. The direct current signals on lead means 35 and 36 may reverse in polarity when the sense of the error reverses. These signals on lead means 35 and 36 are accordingly adapted to move the casing 17 in manners which tend to correct the angular error by causing the direction to the target source to coincide with the optical axis and reduce the error signals on lead means 35 and 36 to zero.

Particular reference should be made now to Figs. 3A and 3B, which illustrate the operation of the apparatus of Fig. 2 under certain assumed conditions, viz., that the reticle 8 is not rotating about its own axis, and that the direction to the target source coincides substantially with the optical axis. The reticle 8, Fig. 3A, has opaque sectors $b$, $d$, $f$ and $h$, and transparent sectors $a$, $c$, $e$ and $g$. As in an ordinary conical scan system, in the apparatus of the instant invention, as a result of rotation of the reticle axis about the optical axis the image of a target describes a circle relative to the reticle axis, and this circle is indicated by the dashed line path 42, Fig. 3A. The output of the photodetector 25 is a pulsed signal, as indicated in Fig. 3B, the pulses $a'$, $c'$, $e'$ and $g'$ being provided by passage of energy through transparent sectors $a$, $c$, $e$ and $g$, respectively. If, as assumed, the reticle does not rotate on its own axis, then as in a conventional conical scan system, the pulsed signal on lead 34 is not frequency modulated unless the circle or other path described by the image or source is not concentric with the axis of the reticle.

The center frequency of the pulse signal may be increased by rotating the reticle 8 about its own axis in a direction opposite to the rotation of the axis of the reticle about the optical axis. While this manner of rotation is preferable, rotation in the same direction is also satisfactory provided that the reticle rotates about its own axis at a speed substantially different from the speed of rotation of the reticle axis about the optical axis.

Figure 4B:
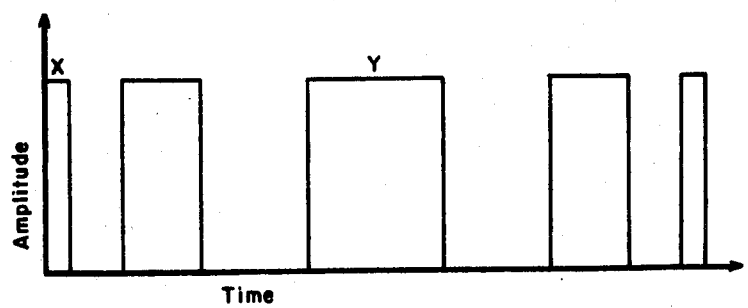

Particular reference should be made now to Figs. 4A and 4B which illustrate the operation of the apparatus of Fig. 2 while the line of sight direction to the target source is displaced from the optical axis 14 causing the image T in the image plane to be displaced from the optical axis as illustrated by Fig. 4A. In Fig. 4A, the circular path of the axis of the reticle is indicated by 43, and is concentric with the optical axis 14. The image of the target source at point T is seen to be displaced from the optical axis. The reticle 8' in solid line shows the reticle with its axis in the nearest position to the image of the target source, whereas the reticle 8" in dashed line indicates the reticle when its axis is at the greatest distance from the image T of the target source. Under such conditions, assuming the axis 13 of the reticle is rotating at a uniform rate about the optical axis 14, the time it takes a point T corresponding to the source image to cross a given sector, or for a given sector to cross point T in the image plane, varies from a minimum time $x$ indicated by the solid line to a maximum time $y$ indicated by the dashed line so that the output of the radiant energy detector 25 on lead 34 is pulse width modulated, or frequency modulated. The aforementioned phase detector 31 is constructed and arranged to provide a signal on one or both of the lead means 35 and 36 which will operate servos 18 and 19 in manners which tend to reduce the angular error to zero, that is, cause the optical axis to coincide with the direction to the target source.

Particular reference should be made now to Fig. 1C in which a reticle according to another embodiment of the invention is shown and generally designated 37. Use of a reticle such as that shown at 37 permits positional information in terms of amplitude modulation rather than frequency modulation, the reticle 37 having a density gradient in the radial direction as shown by the lines 38, the distance between lines corresponding to the density gradient. The density, or degree of opaqueness, or degrees of transparency, may either decrease or increase from the center or axis 39 of the reticle to the outer edge 40 thereof, but the variation should preferably be monotonic. As the axis of this reticle 37 is rotated about the optical axis, unless the target image lies directly on the optical axis, the energy transmitted by the reticle undergoes an amplitude modulation, the percentage of modulation being governed by the radial displacement of the image from the optical axis, and the time phase of the modulation being governed by the angular disposition of the target from the optical axis with respect to the position of the reticle. Where it is desired to use reticle 37, suitable modification may be made of apparatus 33 and if desired of phase detectors 31, in a manner which will be readily apparent to those skilled in the art.

Particular reference should be made now to Fig. 1D in which there is shown a reticle generally designated 41 combining the features of reticle 8 and reticle 37, and illustrating a third embodiment of the instant invention. It will be noted that the reticle 41 has a gradient density similar to that of reticle 37, on which there is superposed a sectored pattern similar to that of reticle 8, and this arrangement facilitataes discrimination of a target from a background provided that the rotation of the reticle 41 is not at the same speed and in the same direction as the rotation of the reticle axis about the optical axis. The background radiation covering the entire reticle substantially uniformly is not periodically varied in intensity at the detector cell 25. Accordingly, the total radiant energy passing through this reticle 41 has a constant component due to the background radiation, together with a pulsed component due to movement of the target image with respect to the sectors. The amplitude of the pulsed component is modulated at the rate of rotation of the reticle axis about the optical axis, with an amplitude dependent upon the displacement of the target image from the optical axis.

Whereas the invention has been described with emphasis upon periodic changes in pulse width or pulse duration while the target source lies at an angle with respect to the optical axis, it should be noted that frequency modulation of the output of detector 25 is also a result of an angular deviation, and this characteristic of the detector output signal may be utilized to provide tracking signals.

The effect of rotating the reticle itself about its own axis in addition to rotating the axis of the reticle about the optical axis is to increase the normal or center frequency of the detector output signal on lead 34.

Where the word "optical" is used herein with respect to lenses, reflectors or radiant energy sensitive devices, it should be understood that the word is used as generic to include invisible as well as visible portions of the radiant energy spectrum.

Whereas the reticles 8, 37 and 41 preferably move in a plane coplanar with the image plane containing the focal point of the optical system, the plane of movement of the reticles may if desired lie to either side of the image plane.

Whereas the invention has been shown and described with reference to a preferred embodiment thereof of which gives satisfactory results, it should be understood that changes may be made and equivalents substituted without departing from the spirit and scope of the invention.

I claim as my invention:

1. In radiant energy tracking apparatus, in combination, focusing means having an optical axis for focusing energy from a remote energy source at a focal point, disc-shaped reticle means disposed near said focal point, means connected to the reticle means for moving the center thereof in a circular path, the line of sight to the remote energy source passing through the circle formed by the circular path, said reticle means being constructed and arranged to pass at least some of the radiant energy in amounts which vary depending upon the angular distance between the direction to the source and said optical axis and upon the instant position of the reticle means, detector means disposed in predetermined position with respect to the reticle means and adapted to receive radiant energy passed by the reticle means, moving means operatively connected to the focusing means, and means operatively connecting the detector means to the moving means for utilizing the output of the detector means to move the focusing means in a manner which tends to reduce the angular deviation between the direction to the source and said optical axis.

2. In radiant energy tracking apparatus, in combination, optical focusing means for energy from a remote energy source, said focusing means having an optical axis, time division means dividing the energy from said source into a plurality of pulsed portions, said time division means including a circular reticle having a plurality of alternately disposed opaque and transparent sectors and means operatively connected to the reticle for rotating the axis of the reticle about said optical axis at a predetermined substantially constant speed, radiation sensitive detector means disposed in predetermined position with respect to said reticle and adapted to receive radiant energy passing through the transparent sectors of the reticle, the reticle and reticle axis rotating means providing that the plurality of portions of the energy of the remote energy source are substantially equal in duration while the direction to the remote energy source corresponds substantially to said optical axis and that the portions of energy vary in duration periodically while the direction to the energy source lies at an angle with respect to said optical axis, and means operatively connected to the detector means and to the focusing means for utilizing the output of the detector means to move the focusing means in a manner which tends to align said optical axis and said direction to said remote energy source.

3. In radiant energy tracking apparatus, in combination, focusing means for energy from a remote energy source, said focusing means having an optical axis, movable reticle means disposed in predetermined position with respect to said focusing means, reticle moving means operatively connected to the reticle means for rotating the axis of the reticle means at a substantially constant rate about the optical axis, said reticle means including a plurality of alternate opaque and transparent sectors, radiant energy detector means disposed in predetermined position with respect to the reticle means and adapted to receive radiant energy passing through said transparent sectors and to provide an output signal which varies in amplitude with variations in the instant amount of energy reaching the detector means, said reticle means being constructed and arranged to provide that pulses of radiant energy of substantially equal duration arrive at the detector means while the direction to the remote energy source is substantially aligned with said optical axis, said reticle means further providing that pulses of radiant energy which vary periodically in duration reach said detector means while the direction to the remote energy source lies at an angle with respect to said optical axis, means mounting the focusing means, reticle means, reticle moving means and detector means for movement together in a preselected manner, and other moving means operatively connected to the mounting means, to the detector means and to the reticle moving means for utilizing the output of the detector means to move said mounting means in a manner which tends to reduce to zero the angle between the optical axis and the direction to the remote energy source.

4. In radiant energy responsive apparatus, in combination, focusing means for energy from a remote energy source, movable circular reticle means disposed substantially at the focal point of the focusing means, detector means disposed in predetermined position with respect to the reticle means, said reticle means including a plurality of alternate transparent and opaque sectors, moving means operatively connected to the reticle means for rotating the reticle means about its own axis and for simultaneously rotating the axis of the reticle means about the optical axis of the focusing means, and signal utilization means operatively connected to the detector means.

5. In radiant energy responsive apparatus, in combination, means for focusing energy from a remote energy source at a focal point, said focusing means having an optical axis, time division means for dividing said energy into a plurality of pulsed portions, said time division means including a circular movable reticle having a plurality of alternate transparent and opaque sectors and moving means operatively connected to the reticle for rotating the axis of the reticle about said optical axis at a preselected substantially constant rate, said reticle and moving means providing that said plurality of portions are substantially equal in duration while the direction to the remote energy source is substantially in alignment with said optical axis and providing that the plurality of portions vary in duration at a periodic rate while the direction to the remote energy source lies at an angle with respect to said optical axis, and radiation sensitive detector means disposed in predetermined position with respect to said reticle and constructed and arranged to provide an output signal which varies with variations in the duration of said plurality of portions.

6. In radiant energy angular tracking apparatus, in combination, focusing means having an optical axis for focusing energy from a remote energy source at a focal point, movable circular reticle means disposed substantially at said focal point and having a plurality of alternate opaque and transparent sectors, reticle moving means operatively connected to the reticle means for rotating the axis of the reticle means about said optical axis at a preselected substantially constant rate, detector means disposed in predetermined position with respect to the reticle means and adapted to receive radiant energy passing through the transparent sectors of the reticle means, said reticle means and reticle moving means providing that substantially constant amplitude pulses of substantially equal duration of radiant energy reach the detector means while the direction to the source corresponds substantially to said optical axis, said reticle means and reticle moving means providing that constant amplitude pulses of radiant energy of periodically increasing and decreasing duration reach the detector means while the direction to the source lies at an angle with respect to said optical axis, movable mounting means for the focusing means, reticle means, and detector means, pulse width discriminator means operatively connected to receive the output of the detector means, reference signal generator means operatively connected to the reticle moving means, phase sensitive detector means operatively connected to the pulse width discriminator means and to the reference signal generator means and adapted to receive outputs therefrom and to utilize the outputs to obtain a pair of positioning signals suitable for positioning the mounting means in a pair of substantially mutually perpendicular planes, servo means operatively connected to the mounting means and to the phase sensitive detector means for positioning the mounting means in response to positioning signals from the phase sensitive detector means and reducing toward zero the angle between said optical axis and the direction to the remote energy source, and source position indicator means operatively connected to the servo means for indicating the instant direction to the source of distant radiant energy.

7. In radiant energy tracking apparatus, in combination, focusing means having an optical axis for focusing energy from a remote energy source at a focal point, circular reticle means disposed at said focal point and lying in a plane transverse to said optical axis, said reticle means being constructed and arranged to vary the amount of radiant energy passing through the reticle means in accordance with variations in the radial distance from the axis of the reticle means to the point where the radiant energy passes therethrough, detector means disposed in predetermined position with respect to said reticle means, said detector means being constructed and arranged to provide an output signal which varies in amplitude with variations in the instant amount of energy reaching the detector means, moving means operatively connected to the reticle means for periodically changing the position of the reticle means with respect to the optical axis to thereby provide for periodic variations in the amount of energy passing therethrough, and moving means operatively connected to the focusing means, to the reticle means and to the detector means and constructed and arranged to utilize the variations in the output of the detector means to change the position of the focusing and reticle means in a manner which tends to reduce to zero the angular deviation between the direction to the remote energy source and said optical axis.

8. Radiant energy responsive apparatus comprising, in combination, focusing means having an optical axis and adapted to focus at a focal point energy from a remote source of radiant energy, circular reticle means disposed near said focal point in a plane transverse to said optical axis, moving means operatively connected to the reticle axis, moving means operatively connected to the reticle means for moving the same, said reticle means having a transparency which varies uniformly in accordance with variations in the radial distance from the axis of the reticle means and being constructed and arranged to provide for variations in the amount of radiant energy passing therethrough in accordance with the instant position of the reticle means as moved by the moving means, detector means disposed in predetermined position with respect to the reticle means and adapted to receive radiant energy passing through the reticle means and to provide an output signal which varies with variations in the amount of energy falling thereon, and signal utilization means operatively connected to the detector means for utilizing variations in the output signal to provide information regarding the remote energy source.

9. In radiant energy responsive apparatus, in combination, focusing means having an optical axis and adapted to focus energy from a remote energy source, circular reticle means disposed near the focal point, said reticle means having a plurality of alternate transparent and opaque sectors, said transparent sectors having a transparency which varies as the radial distance from the axis of the reticle means varies, means operatively connected to the reticle means for moving the center thereof in a circular path, the line of sight to the remote energy source passing through the circle formed by the circular path, and detector means disposed in predetermined position with respect to the reticle means and constructed and arranged to provide a detector output signal which varies with variations in the amount of radiant energy reaching the detector means through said sectors.

References Cited in the file of this patent

UNITED STATES PATENTS 2,867,393   Burley _____ Jan. 6, 1959